United States Patent [19]

Kobayashi

[11] Patent Number: 4,734,778
[45] Date of Patent: Mar. 29, 1988

[54] SOLID-STATE IMAGE PICKUP APPARATUS
[75] Inventor: Kazunari Kobayashi, Tokyo, Japan
[73] Assignee: Olympus Optical Co., Ltd., Tokyo, Japan
[21] Appl. No.: 879,357
[22] Filed: Jun. 27, 1986
[30] Foreign Application Priority Data Aug. 9, 1985 [JP] Japan .................................. 60-175507

[51] Int. Cl.$^4$ .............................................. H04N 5/30
[52] U.S. Cl. .................................................... 358/229
[58] Field of Search ................... 358/229, 213.13, 909; 354/402, 406–408

[56] References Cited

U.S. PATENT DOCUMENTS 4,491,865  1/1985  Danna et al. .

FOREIGN PATENT DOCUMENTS 58-204680  11/1983  Japan .................................... 358/229
58-210763  12/1983  Japan .................................... 358/229

OTHER PUBLICATIONS

JP-PS 60 62 781 A In: Patent Abstracts of Japan, Sect. M, vol. 9, No. 197 (E-335), Aug. 14, 1985.

Primary Examiner—Jin F. Ng
Assistant Examiner—Stephen Brinich
Attorney, Agent, or Firm—Frishauf, Holtz, Goodman & Woodward

[57] ABSTRACT

A solid-state image pickup apparatus includes a body mounted on an eyepiece section and a solid-state image sensor arranged in the body and having a pickup face opposed to an objective optical system of the eyepiece section. The sensor is fixed to a base which is supported by an adjusting member to be movable in a direction parallel to the pickup face. The base is moved by adjusting centering screws so that the center of the pickup face is aligned with the optical axis of the optical system. A focusing member is supported by the body to be movable along the optical axis. The adjusting member is supported by the body and focusing member to be movable together with the focusing member along the optical axis and universally movable around the point of intersection of the pickup face and the optical axis. The adjusting member is universally moved by tilting screws to adjust the tilt of the pickup face relative to the optical axis.

4 Claims, 4 Drawing Figures

F I G. 3
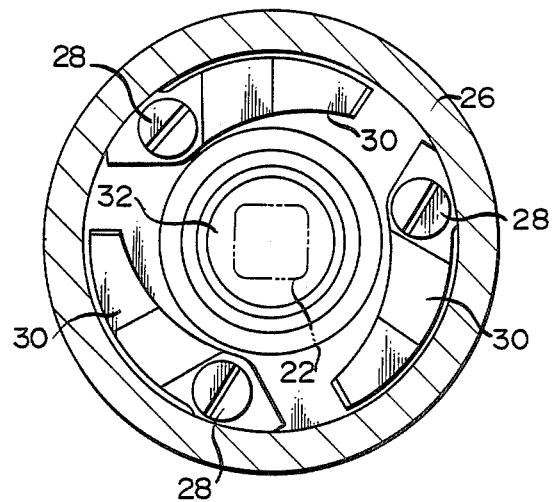
F I G. 4
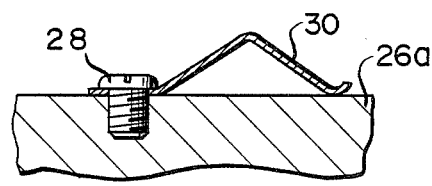

SOLID-STATE IMAGE PICKUP APPARATUS

BACKGROUND OF THE INVENTION

The present invention relates to a solid-state image pickup apparatus.

Recently, a number of endoscopes and cameras have been provided which pick up images by the use of a solid-state image sensor. In these apparatuses, the image sensor must be accurately positioned in relation to an optical system for image pickup. To this end, solid-state image pickup apparatuses have been developed which are provided with various support mechanisms for supporting the image sensor so that the position of the sensor is adjustable.

In general, positioning of the image sensor includes focus adjustment, center alignment, and tilt adjustment of a pickup face. When using the conventional support mechanisms, accomplishment of the focusing and centering work can be spoiled by subsequently adjusting of the tilt of the pickup face. For accurate positioning of the image sensor, therefore, the individual processes of adjustment must be repeated many times, greatly complicating the adjustment or alignment.

SUMMARY OF THE INVENTION

The present invention has been contrived in consideration of these circumstances, and is intended to provide a solid-state image pickup apparatus capable of quickly and accurately positioning a solid-state pickup element with ease.

In order to achieve the above object, a solid-state image pickup apparatus according to the invention includes a solid-state image sensor having a pickup face opposed to an objective optical system; and a support mechanism for supporting the image sensor. The support mechanism includes a body at a predetermined position relative to the optical system, a base on which the image sensor is fixed, an adjusting member for supporting the base so that the base can move in a direction parallel to the pickup face, and a centering mechanism for moving the base to align the center of the pickup face with the optical axis of the optical system. A focusing member is supported by the body to be movable in a direction parallel to the optical axis of the optical system, the adjusting member being supported by the body and the focusing member so as to be movable together with the focusing member along the optical axis and universally movable around the point of intersection of the pickup face and the optical axis. A tilting mechanism universally moves the adjusting member to adjust the tilt of the pickup face relative to the optical axis.

BRIEF DESCRIPTION OF THE DRAWINGS

FIGS. 1 to 4 show a solid-state image pickup apparatus according to an embodiment of the present invention, in which:

FIG. 1 is a longitudinal sectional view of the apparatus;

FIG. 2 is a cross-sectional view taken along line II—II of FIG. 1;

FIG. 3 is a cross-sectional view taken along line III—III of FIG. 1; and

FIG. 4 is a side view of a leaf spring.

DETAILED DESCRIPTION OF THE PREFERRED EMBODIMENT

An embodiment of the present invention will now be described in detail with reference t the accompanying drawings.

Figure 1:
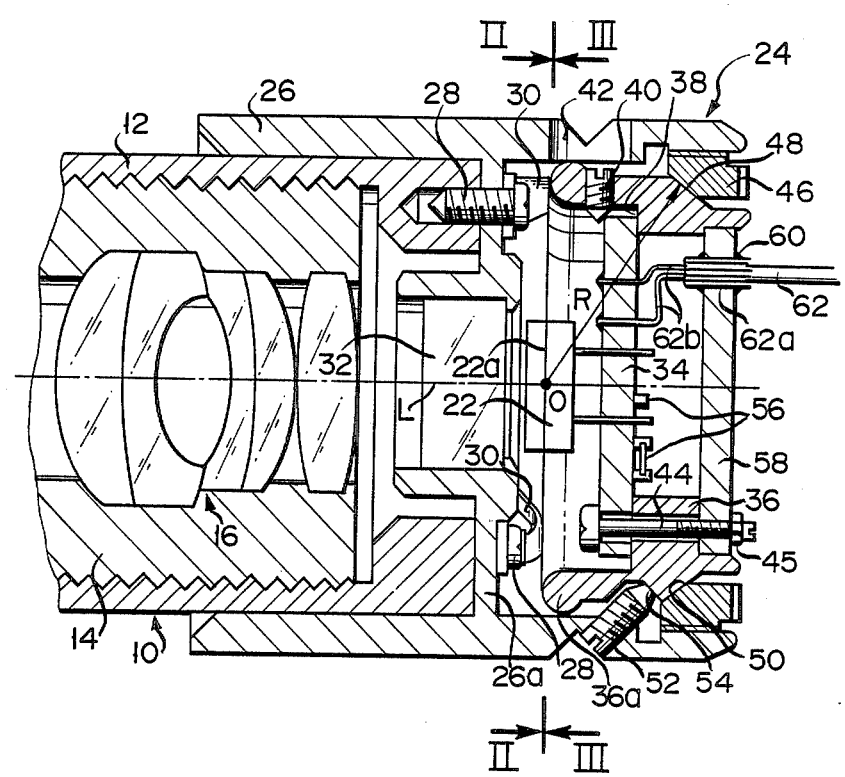

FIG. 1 shows a solid-state image pickup apparatus of the invention attached to eyepiece section 10 of an endoscope. Section 10 includes cylindrical outer tube 12 and body tube 14 screwed therein. Objective optical system 16, including a plurality of lenses, is fixed in tube 14. Optical axis L of system 16 is coaxial with tubes 12 and 14.

The pickup apparatus comprises solid-state image sensor 22, such as a CCD, having pickup face 22a opposed to objective optical system 16, and support mechanism 24 supporting sensor 22 so that the position of sensor 22 relative to system 16 is adjustable. Mechanism 24 has cylindrical body 26 which is fitted on outer tube 12 of eyepiece section 10 and projects forward from tube 12. Annular flange 26a is formed on the inner peripheral surface of the intermediate portion of body 26. It is fixed to the distal end face of outer tube 12 by means of three screws 28 which are arranged at regular intervals in the circumferential direction of flange 26a. Also, three leaf springs 30 are fixed to flange 26a by screws 28, individually. As shown in FIGS. 3 and 4, each spring 30 extends in the circumferential direction of flange 26a and fixed at one end to the flange by its corresponding screw 28. Spring 30 is V-shaped, and its crest portion projects toward the projecting end side of body 26. Moire prevention filter 32 is fixed to flange 26a, facing optical system 16.

Figure 2:
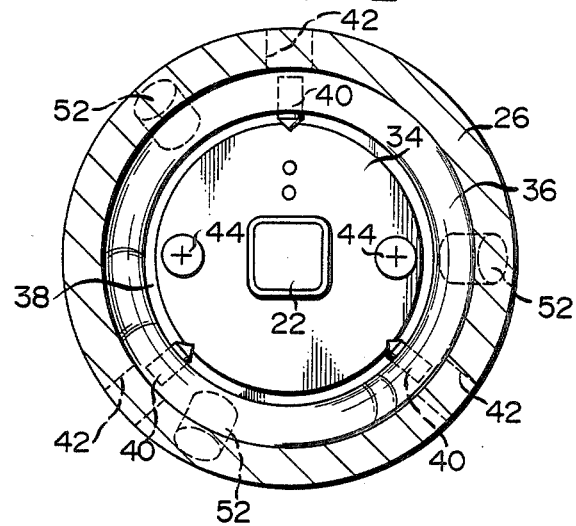

Arranged inside the distal end portion of body 26 are disk-shaped base 34, with image sensor 22 thereon, and substantially cylindrical adjusting member 36 supporting the base. Base 34 extends parallel to pickup face 22a of element 22 and is supported by adjusting member 36 so as to be movable in a direction parallel to face 22a and substantially perpendicular to optical axis L. Member 36 has an outside diameter smaller than the inside diameter of body 26. Annular shoulder portion 38 is formed at the intermediate portion of the inner peripheral surface of member 36 so as to face flange 26a. Base 34 is held against shoulder portion 38 by means of three centering screws 40 which are screwed in adjusting member 36. As shown in FIGS. 1 and 2, screws 40 are arranged at regular intervals in the circumferential direction of member 36 and screwed therein for movement in the radial direction of the member. Each screw 40 has a conical end which engages the peripheral edge of base 34 on the side of objective optical system 16. Body 26 is formed with slits 42 which individually face screws 40. In this arrangement, base 34 can be slid on shoulder portion 38 to be located in any desired position by moving screws 40 from the outside of body 26 through slits 42. Thus, the center of pickup face 22a of solid-state image sensor 22 can be aligned with optical axis L. After this center alignment, base 34 is fixed firmly to adjusting member 36 by means of clamp screws 44 and nuts 45.

End portion 36a of adjusting member 36 on the side of objective optical system 16 has a substantially circular section, projecting radially outward and abutting against the inner surface of body 26 and leaf springs 30. Member 36 is supported by cylindrical focusing ring 46 which is screwed in the projecting end portion of body 26 for movement along optical axis L. The adjusting member has contact face 48 on its outer peripheral surface. The contact face is a convex spherical surface with radius R of curvature which has its center of curvature on point O of intersection of axis L and pickup face 22a. Focusing ring 46 has support face 50 on its inner peripheral surface. Support face 50 is a concave spherical surface with radius R which has its center of curvature on axis L. Adjusting member 36 is urged toward ring 46 by leaf springs 30 so that faces 48 and 50 are kept closely in contact with each other. Thus, member 36 can universally move about point O. Also, it can move along optical axis L as ring 46 moves. Three tilting screws 52 are screwed in body 26, arranged at regular intervals in the circumferential direction of the body so as to be movable in the tangential direction of contact face 48. The point of each screw 52 abuts against end face 54 of a notch which is cut in the outer peripheral surface of adjusting member 36. Thus, member 36 can be rotated to adjust the tilt of pickup face 22a by advancing or retreating screws 52.

Various electronic components 56 are mounted on that surface of base 34 opposite to objective optical system 16. An open end of adjusting member 36 on the side of the projecting end of body 26 is closed by circular cover plate 58. Plate 58 is formed with aperture 60 through which is passed signal cable 62 formed of a coaxial cable. The distal end portion of cable 62 is unshelled to expose outside conductors 62a, which are turned back toward the proximal end side of the cable to be put on the outside of the cable. That portion of the cable covered with conductors 62a is passed through aperture 60 and then fixed to cover plate 58 by brazing. Also exposed, inside conductors 62b are brazed to base 34. In this arrangement, external force applied to signal cable 62 acts on plate 58 without stressing junctions of conductors 62b. The proximal end of cable 62 is connected to an image processing apparatus (not shown).

There will now be described the way pickup face 22a of image sensor 22 is positioned relatively to objective optical system 16 in the solid-state image pickup apparatus constructed in the aforementioned manner. First, center O of pickup face 22a is aligned with optical axis L. In this case, base 34 and image sensor 22 are moved in the direction across axis L by suitably advancing or retreating centering screws 40 with clamp screws 44 loosened. When center O is in alignment with axis L, screws 44 are tightened. By this adjustment, the center of face 22a is aligned with the center of rotation of adjusting member 36.

Then, focus adjustment is performed. In doing this, focusing ring 46 is rotated so that adjusting member 36, base 34, and pickup element 22, along with ring 46, move along optical axis L. Thus, the position of pickup face 22a relative to the focus of objective optical system 16 is adjusted. In this case, only the central portion of face 22a must be in focus.

Finally, the tilt of pickup face 22a is adjusted. This is done by suitably moving tilting screws 52 to rotate adjusting member 36 so that face 22a is positioned at right angles to optical axis L. As mentioned before, the center of face 22a is in alignment with the center of rotation of member 36. Accordingly, it will never move if member 36 may be rotated in any direction for the tilt adjustment. Thus, the previous accomplishment of the center alignment and focus adjustment cannot be spoiled.

According to the solid-state image pickup apparatus constructed in this manner, adjusting member 36 can rotate around the point of intersection of pickup face 22a and optical axis L. Even though the tilt adjustment is performed after the center alignment and focus adjustment of face 22a, therefore, the center and focus cannot be dislocated. Thus, the positioning of solid-state image sensor 22, relative to objective optical system 16, can be achieved easily and quickly. By using metal as the material for the members surrounding image sensor 22, moreover, the sensor can be shielded with ease.

It is to be understood that the present invention is not limited to the embodiment described above, and that various changes and modifications may be effected therein by one skilled in the art without departing from the scope or spirit of the invention. For example, screws 40 and 52 and leaf springs 30 are not limited to three in number, and may be increased or decreased as required. Also, coil springs may be used in place of the leaf springs.

What is claimed is:

1. A solid-state image pickup apparatus for picking up an optical image formed by an objective optical system, comprising:

a solid-state image sensor having a pickup face opposed to the optical system; and a support mechanism supporting the image sensor, said mechanism including a body disposed in a predetermined position relative to the optical system, a base on which the image sensor is fixed, an adjusting member supporting the base so that the base can move in a direction parallel to the pickup face, centering means for moving the base to align the center of the pickup face with the optical axis of the optical system, a focusing member supported by the body to be movable along the optical axis of the optical system, said adjusting member being supported by the body and the focusing member to be movable together with the focusing member along the optical axis of the optical system and universally movable around the point of intersection of the pickup face and the optical axis, and tilting means for universally moving the adjusting member to adjust the tilt of the pickup face relative to the optical axis.

2. An apparatus according to claim 1, wherein said adjusting member includes a convex spherical contact face having its center of curvature on said point of intersection, said focusing member includes a concave spherical support face having its center of curvature on the optical axis and having the same radius of curvature as the contact face, and said support mechanism includes urging means for urging the adjusting member toward the focusing member so that the contact face is closely in contact with the support face.

3. An apparatus according to claim 2, wherein said tilting means includes a plurality of tilting screws screwed in the body for movement in the tangential direction of the support face and having their respective ends abutting against the adjusting member, said tilting screws being arranged at regular intervals in the circumferential direction around the optical axis.

4. An apparatus according to claim 1, wherein said centering means includes a plurality of centering screws screwed in the adjusting member for movement in a direction parallel to the pickup face and having their respective ends abutting against the base, said centering screws being arranged at regular intervals in the circumferential direction around an axis passing through the center of the pickup face at right angles thereto.

* * * * *